United States Patent [19]
Raskin

[11] 3,969,934
[45] July 20, 1976

[54] LOAD CELL AMPLIFIER

[76] Inventor: Seymour H. Raskin, P.O. Box 35549, 6901 Forest Park, Dallas, Tex. 75235

[22] Filed: Sept. 16, 1974

[21] Appl. No.: 506,318

Related U.S. Application Data

[63] Continuation-in-part of Ser. No. 280,772, Aug. 15, 1972, Pat. No. 3,837,222.

[52] U.S. Cl. .............................. 73/141 A; 177/210
[51] Int. Cl.² ........................................... G01L 1/04
[58] Field of Search ................. 73/141 A, 100, 432, 73/88 R; 177/210

[56] References Cited
UNITED STATES PATENTS

| | | | |
|---|---|---|---|
| 2,213,982 | 9/1940 | Frey et al. ..................... | 73/88.5 R X |
| 2,319,299 | 5/1943 | Converse ......................... | 73/141 A |
| 2,476,941 | 7/1949 | Woodward ....................... | 73/141 A |
| 2,880,612 | 4/1959 | Coyne et al. ..................... | 73/88.5 R |

FOREIGN PATENTS OR APPLICATIONS

| | | | |
|---|---|---|---|
| 247,706 | 2/1926 | United Kingdom ................ | 73/88 R |

Primary Examiner—Charles A. Ruehl
Attorney, Agent, or Firm—Howard E. Moore; Gerald G. Crutsinger

[57] ABSTRACT

A load cell of the beam type comprising an operator member having a pair of parallel longitudinally extending slots forming a central beam member and a pair of parallel bearing members spaced outwardly of the central beam member, the outer ends of the bearing members and the central beam member being integral. The operator member has a pair of support members extending outwardly from opposite sides thereof, the support members being positionable on horizontal laterally spaced surfaces on a support block. The load or force to be measured is applied to the central portion of the central beam member which is provided with deflection measuring apparatus at points of inflection of the elastic curve of a beam member. The deflection measuring apparatus preferably comprises an indicator arm extending perpendicularly from the central beam member such that the end of the indicator arm is moved a substantial distance upon slight angular deflection of the elastic curve or the neutral axis of the central beam member to indicate the magnitude of force applied to deflect the beam member.

24 Claims, 20 Drawing Figures

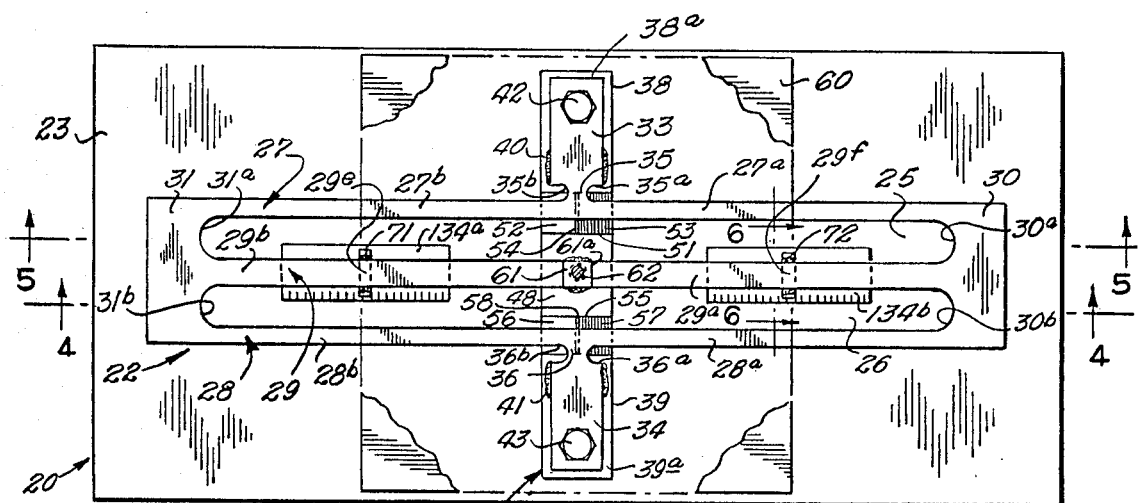
Fig. 1
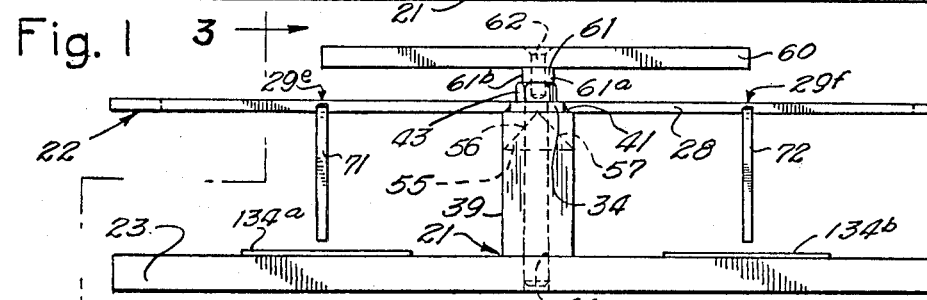
Fig. 2
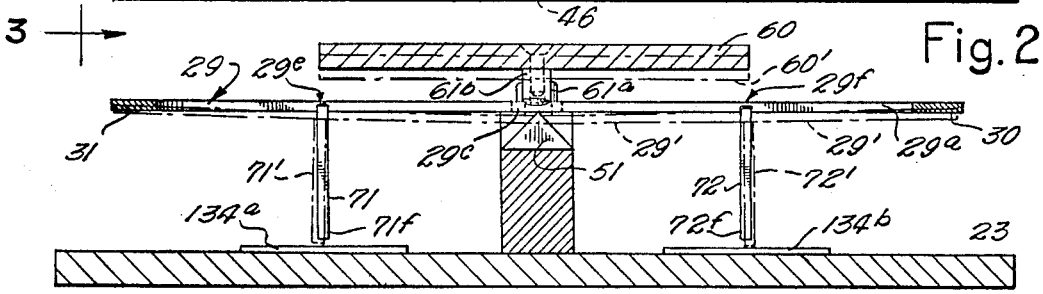
Fig. 4
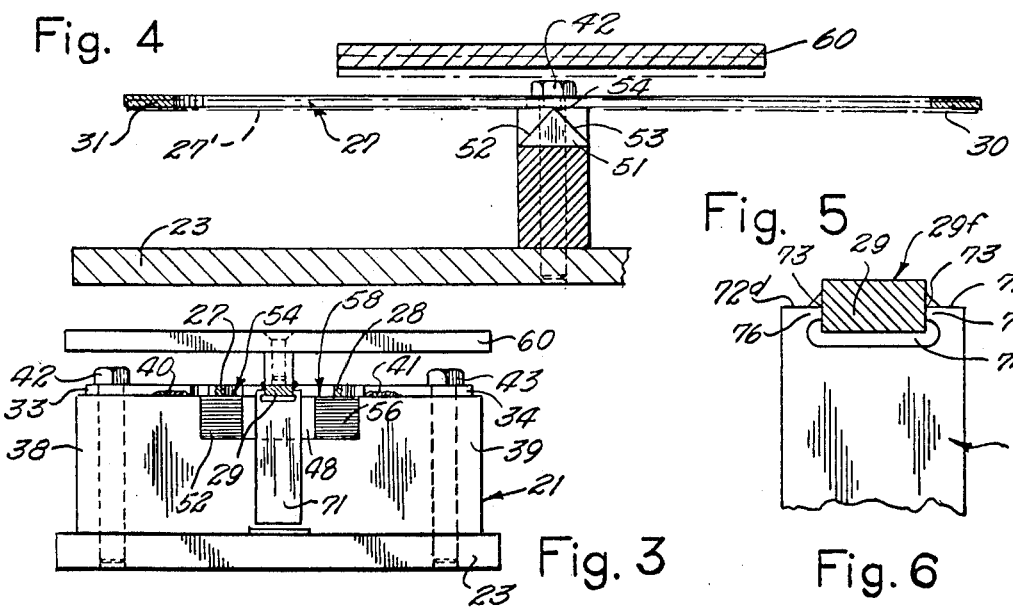
Fig. 3
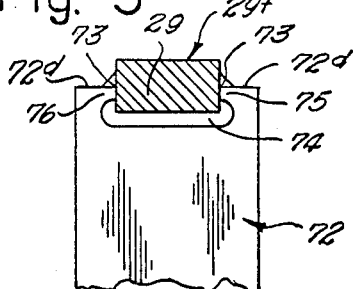
Fig. 5
Fig. 6

LOAD CELL AMPLIFIER

CROSS-REFERENCE TO RELATED APPLICATIONS

This application is a continuation-in-part of my copending application Ser. No. 280,772, now U.S. Pat. No. 3,837,222, filed Aug. 15, 1972, entitled "Load Cell".

BACKGROUND OF INVENTION

The load cell described in my copending application Ser. No. 280,772 comprised a beam member having electric resistance strain gages secured to upper and lower surfaces thereof. The strain gages were connected to a Wheatstone bridge circuit to indicate the magnitude of force transmitted to the beam member.

The load cell incorporating electric resistance strain gages offered significant improvements over the devices previously devised. However, under certain operating conditions noise in electrical amplifying systems introduced disrupting signals which introduced error and also established upper and lower limits to the magnitude of the electrical signal which could be accurately measured.

In the employment of electrical resistance strain gages, a grid of fine wire is subjected to the same strain as the surface of the test piece to which it is attached. Since strain is defined as deformation divided by the length in which the deformation occurs, the strain at the surface of a relatively stiff beam is small when the beam is subjected to a light load as compared to the strain when the beam is subjected to heavy loads.

In the design of a load cell employing electrical resistance strain gages in an electrical system to indicate loading on a beam, design of the load cell required careful selection of electrical components having limited operating ranges to provide reasonably accurate indication of force applied to the beam.

In summary, under certain operating conditions, electrical resistance strain gages, attached to a load beam of a load cell, and the electrical circuitry associated therewith have certain inherent characteristics which limit precise measurement of force over a wide range of force applied.

SUMMARY OF INVENTION

I have devised an improved method and apparatus for determining deflection of a load beam member which is supported by means which eliminate or minimize the imposition of extraneous forces on the beam member which would effect the accuracy of measurement of the load applied to the beam member. One end of an indicator arm is secured to the load beam member at opposite sides of the neutral axis lying within the elastic curve, of the beam member and the indicator arm is positioned to extend perpendicular to the neutral axis and elastic curve of the load beam. As the load is applied to the beam, the free end of the indicator arm will move a distance which is a function of the angle of deflection of the neutral axis of the beam. Suitable means is employed to relate movement of the free end of the indicator arm to the magnitude of force applied to the load beam member.

A primary object of the invention is to provide a load cell comprising a load beam member which deflects when a load is applied thereto, the load beam being supported by means which eliminate or minimize the imposition of extraneous forces on the beam member and the beam member having means associated therewith to indicate the angle of deflection of neutral axis of the beam when a load is applied to the beam.

Another object of the invention is to provide a load cell having a beam member which has a neutral axis in combination with an indicator arm secured to the beam adjacent opposite sides of the elastic curve extending through the neutral axis of the beam and extending perpendicular to the elastic curve passing through the neutral axis of the beam such that movement of a free end of the indicator arm is a function of the angle of deflection of the elastic curve.

Another object of the invention is to provide a load cell which is of simple construction, easily assembled and provides great accuracy for measurement of load applied thereto.

A further object of the invention is to provide a load cell having a planar operator member provided with a pair of longitudinal slots defining a central beam member and a pair of parallel longitudinal bearing members, the bearings members and the beam member being connected at their opposite ends and integral with one another, the bearing members being supportable by a support block, outwardly of the bearing members, by a pair of outwardly extending transverse connector portions.

A still further object of the invention is to provide a load cell having a central load beam secured to spaced bearing members wherein the effective bending lengths of the bearing members are equal to the effective bending length of the beam member; wherein the effective combined width of the support members is equal to the width of the beam member, such that the angle of deflection of the neutral axis of the beam is zero at each end thereof; and wherein spaced indicator arms are secured to the beam member at the neutral axis of the beam member such that movement of the end of one of the legs relative to the end of the other leg is a function of the magnitude of force applied to the beam and directed perpendicular to the plane of the neutral axis of the beam.

Other and further objects of the invention will become apparent upon referring to the detailed description hereinafter following and to the drawings annexed hereto.

DESCRIPTION OF DRAWING

Drawings of preferred embodiments of the invention are annexed hereto so that the invention may be better and more fully understood, in which:

FIG. 1 is a plan view of a first embodiment of the load cell, parts being broken away to more clearly illustrate details of construction;

FIG. 2 is a side elevational view of the load cell;

FIG. 3 is a cross-sectional view taken along line 3—3 of FIG. 2;

FIG. 4 is a cross-sectional view taken along line 4—4 of FIG. 1;

FIG. 5 is a cross-sectional view taken along line 5—5 of FIG. 1;

FIG. 6 is an enlarged cross-sectional view taken along line 6—6 of FIG. 1;

Numeral references are employed to designate like parts throughout the various figures of the drawings.

DESCRIPTION OF A PREFERRED EMBODIMENT

Figure 7:
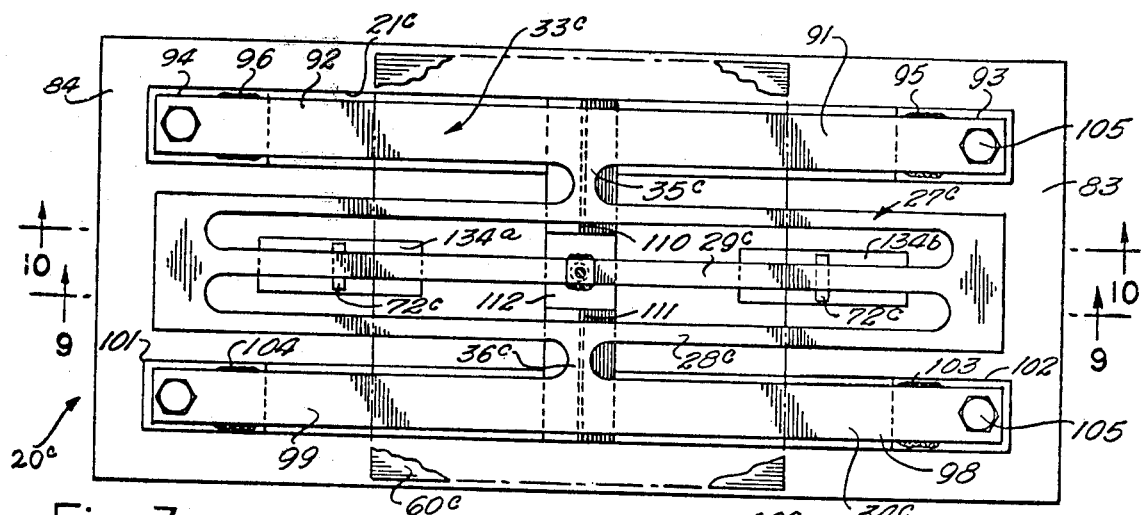
FIG. 7 is a plan view of a second embodiment of the load cell, parts being broken away to more clearly illustrate the details of construction.
Figure 8:
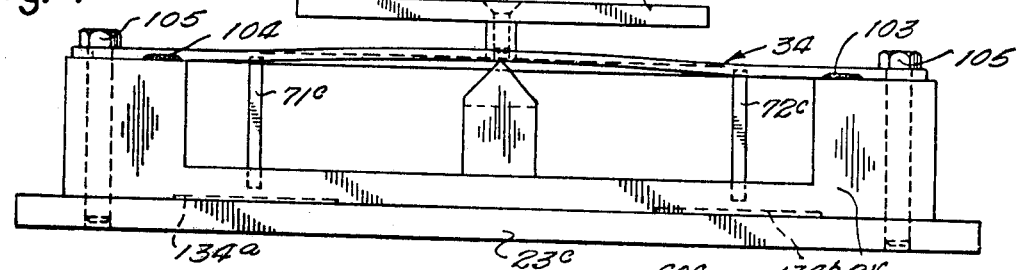
FIG. 8 is a side elevational view of the load cell illustrated in FIG. 7.
Figure 9:
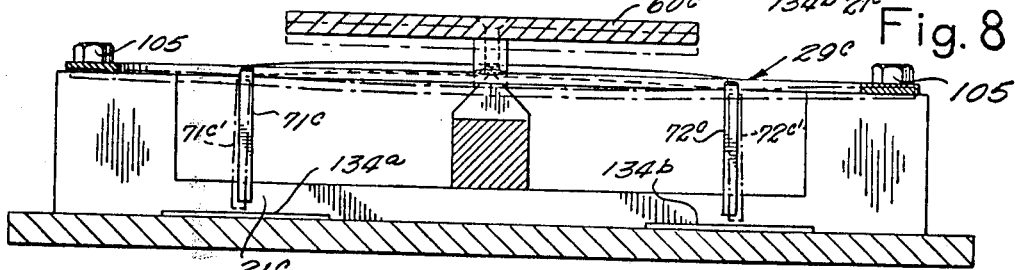
FIG. 9 is a cross-sectional view taken along line 9—9 of FIG. 7.
Figure 10:
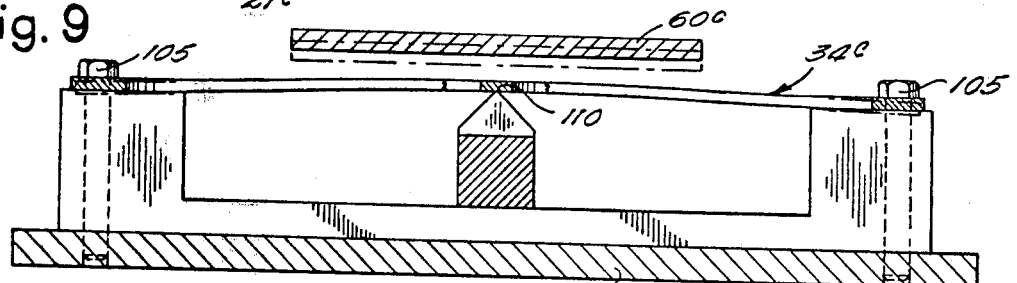
FIG. 10 is a cross-sectional view taken along lin3 10—10 of FIG. 7.
Figure 11:
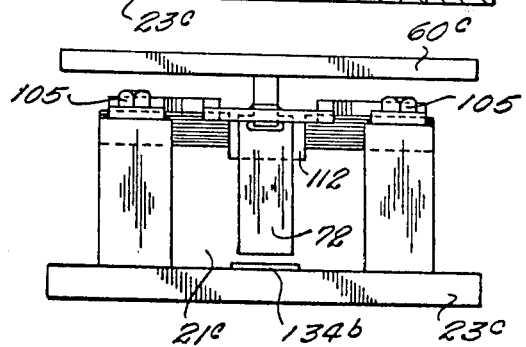
FIG. 11 is an end elevational view of the load cell illustrated in FIG. 7.

Referring now particularly to FIGS. 1 through 6 of the drawings, the load cell 20 embodying the invention, which includes a support block 21 and an operator member 22, is shown in use as a weighing scale mounted on a suitable support, such as a rectangular plate 23 which may rest on a planar surface such as a table top or the like. The planar operator member 22, which is formed of steel or other suitable elastic substance, is substantially rectangular in shape and is provided with a pair of parallel longitudinal slots 25 and 26 which define parallel outer bearing members 27 and 28 and a central beam member 29. The outer ends of the central beam member 29 are secured to the outer ends of the bearing members 27 and 28 by the end portions 30 and 31 of the operator member. The width of the beam member 29 is preferably equal to the combined widths of the bearing members 27 and 28 as will be hereinafter more fully explained.

The operator member 22 is supported on the block 21 by means of the laterally outwardly extending support members 33 and 34 thereon which are disposed outwardly of the central portions of the bearing members 27 and 28 and which are connected thereto by the connector members 35 and 36 which are of lesser width than the widths of the support members 33 and 34.

The support members 33 and 34 rest on the upwardly facing horizontal surfaces 38a and 39a of the end portions 38 and 39 of the support block which are disposed outwardly of the bearing members 27 and 28, respectively, of the operator member 22.

The support members 33 and 34 may be secured to the end portions 38 and 39 of the support block 21 by welds 40 and 41 or may also be secured by bolts 42 and 43 which extend downwardly through aligned apertures in the support members 33 and 34 and into the threaded bores 46 formed in the end portions 38 and 39 of the support block 21.

The support block 21 is provided with a central slot or groove 48, as illustrated in FIG. 3, to permit downward deflection of the central portion of the beam member 29. A substantially triangular portion 51 of the block 21 is defined by the surfaces 52 and 53 which extend convergently upwardly to form a horizontal very narrow knife edge or surface 54 which is engaged by the central portion of the bearing member 27 and by the central portion of the connector portion 35 of the operator member 22. Similarly, on the other side of the central groove 48, the block has a substantially triangular portion 55 defined by the upwardly convergent surfaces 56 and 57 which converge upwardly to form a narrow edge or support surface 58 which is engaged by the central portion of the bearing member 28 and by the central portion of the connector portion 36 of the operator member 22.

The narrow knife edges 54 and 58 lie in the same horizontal plane as the top surfaces 38a and 39a of the end portions 38 and 39 of the support block 21.

When the load cell is to be used in a scale, a platform 60, on which objects to be weighed are placed, is connected to the central portion of the beam member 29 by a load support block 61 having a bottom surface which rests upon the central portion of the beam member 29 and which is secured thereto in any suitable manner, as by welding. The width of the load support block 61 is equal to the combined widths of the connector portions 35 and 36 for a reason to be described below. The platform 60 may of course be connected to the load support block 61 in any suitable manner, as by means of a screw 62 which extends through a suitable aperture in the platform into an upwardly opening threaded bore formed in the load support block 61.

It will be apparent, as illustrated in FIG. 4, that the beam member 29 will deflect downwardly as a load is placed on the platform 60 to a position 29' such as illustrated in broken lines in FIG. 4 and that this downward force will also cause the outer ends of the bearing members 27 and 28 to move downwardly since the downward force exerted by the load is transmitted to the outer opposite end portions of the bearing members 27 and 28 by the end portions 30 and 31 of the operator member. The opposite ends of the bearing members will move downwardly to the position 27' as illustrated in broken lines in FIG. 5, as a load is imposed on the platform.

It will be apparent that the portion 27a of the bearing member 27 which extends from substantially the tangent point of the arcuate side surface 35a of the connector member 35 to the tangent point of the surface 30a of the connector end portion 30 of the operator member may bend or act as a spring and, similarly, the other end portion 27b of the support member 27 which extends substantially from the tangent point of the side surface 35b of the connector portion 35 to the tangent point of the surface 31a of the end portion 30 also acts as a spring. The combined width of the bearing member 27 and the connector member 35 are such that, for the usual or normal loads imposed on the beam member 29 by objects whose weight is to be determined and placed on the platform 60, no significant bending can occur of the connector portion 35 and of the central portion of the bearing member 27. As a result, bending of the bearing member 27 may take place only along the portions 27a and 27b thereof.

Similarly, the bending of the other bearing member 28 may occur only along the portions 28a and 28b thereof extending between the tangent points of the surfaces 36a and 30b and the tangent points of the surfaces 36b and 31b. The deflection or bending of the beam member 29 takes place along the portions 29a and 29b thereof between the sides 61a and 61b of the platform support block 61 and the end surfaces 30a, 30b, 31a and 31b, respectively, defining the outermost ends of the slots 25 and 26. The width of the support block 61 between its sides 61a and 61b is made substantially equal to the width of the connector portions 35 and 36. It will thus be apparent, since the block post 61 rigidifies the central portion 29c of the beam, combined bending lengths of the portions 29a and 29b of the beam 29 are substantially equal to the combined bending lengths of the portions 27a and 27b of the bearing members 27 and 28. Since, in addition, these combined widths of the bearing members 27 and 28 are equal to the width of the beam member 29, the stresses imposed on the bearing members will be equal to the stresses imposed on the beam member 29. This uniformity in stress forces results in the stresses at the top and bottom surfaces of the beam 29.

From the foregoing it will be appreciated that the operator member 22 is symmetrical on each side of a vertical longitudinally extending central plane (not shown) extending axially of the central beam member 29. It will also be appreciated that operator member 22 is symmetrical on each side of a vertical transversally extending central plane (not shown). When a force directed downwardly is applied at the center of beam member 29, the neutral axis of the beam member is horizontal at each end of the beam member and at the center. As will be hereinafter more fully explained, points of inflection of the neutral axis are at points equidistantly spaced between the center of the beam member 29 and ends thereof.

Due to the symmetrical configuration of operator member 22, beam member 29 functions as a constrained beam which is held at both ends such that the tangent to the elastic curve or neutral axis remains fixed in direction. However, ends of beam member 29 move horizontally and vertically upon bending of the elastic curve of the beam member 29. "Elastic curve" as used herein is the edge of the elastic plane which intersects side faces of beam member 29. The elastic plane or neutral plane extends longitudinally of the beam member 29 and divides the concave side of the beam which is in compression upon bending from the convex side of the beam which is in tension.

The narrow knife-edged surfaces 54 and 58 support the central portions of the bearing members 27 and 28 against any torsional movement thereof as indicated in FIG. 3. The end portions 30 and 31 of the operator member similarly tend to limit or prevent imposition of torsional forces to the outer portions of the outer ends of the beam because of the symmetry of operator member 22. The surfaces 54 and 58 are not provided for the vertical support of the operator member 22, this function being performed by the connector portions 35 and 36, nor do they provide for the support of the bearing members 27 and 28, this function also being performed by the connector portions 35 and 36.

As a result, the portions 27a and 27b and 28a and 28b of the bearing members on opposite sides of the connector members 35 and 36 and the beam portions 29a and 29b are free to bend in accordance with the load imposed on the beam member by an object or load deposited on the platform 60.

Due to the support of the bearing members outwardly of their outside longitudinal edges so that the bending portions 27a and 27b and 28a and 28b are free to deflect or bend downwardly from opposite ends of the connector members or portions 35 and 36, which are integral with the bearing members, no extraneous forces or stresses are imposed on the bearing members which would tend to make the flexure of the beam member non-linear with load.

In certain applications it may not be necessary to provide the surfaces 54 and 58 to resist the imposition of torsional forces as, for example, in the case where the loads are of limited ranges or if the connector portions 35 and 36 are made relatively wide as compared to the lengths of the bearing members 27 and 28.

Assuming that the beam member 29 has a length L, beam member 29 has a point of inflection at a distance L/4 from each end 29a and 29b of the beam 29. At the points of inflection 29e and 29f, the elastic curve 73 of the beam member 29 changes from a curve which is concave downward to a curve which is concave upward. Therefore attachment of legs 71 and 72 at 29e and 29f will not affect the bending of the beam 29.

As best illustrated in FIG. 6, the indicator arms 71 and 72 are secured to the beam 29 with the ends 71d and 72d of the arms 71 and 72 aligned with the elastic curve 73 of the beam 29 which contains the center of gravity of the cross-section of the beam. A notch 74 is formed in the upper portion of arms 71 and 72 so that the arms do not touch the beam 29 except at the weld lugs 75 and 76.

Arms 71 and 72 are secured to the beam 29 at points of inflection 29e and 29f on the ends 29a and 29b by welding such that as beam 29 deflects to the position 29' shown in dashed outline, the free ends 71f and 72f of arms 71 and 72 move outwardly to the positions 71' and 72' shown in dashed outline in FIG. 4 of the drawing.

As the arms 71 and 72 move to positions 71' and 72' they move in an arc which may be measured to determine the deflection of the beam. The deflection is directly proportional to the length of arms 71 and 72 and the bending of the beam which is proportional to the load placed thereon. The arms should be of sufficient length to give a reliable standard of measurement for the particular weight units to be measured such that minute changes may be measured as hereinafter described.

Referring now particularly to FIGS. 7 through 11 of the drawings, the load cell 20c is similar to the load cell 20 and, accordingly, its elements have been provided with the same reference numerals to which the subscript c has been added, as the corresponding elements of the load cell 20. The load cell 20c differs from the load cell 20 principally in that an upward prestress is imparted to its bearing members 27c and 28c and the connector portions 35c and 36c. The support member 33c has portions 91 and 92 which extend longitudinally in opposite directions to the end portions 83 and 84 of the support block 21c and rest on the top horizontal surfaces thereof. The extreme end portions of the portions 91 and 92 are secured to the support block portions 93 and 94, respectively. Similarly, the support member 34c has longitudinal portions 98 and 99 which extend longitudinally in opposite directions from the connector member 36c and are secured to the end portions 102 and 101 of the support block by welds 103 and 104, respectively.

The support block is secured to a base plate 23c by means of bolts 105 which extend through aligned apertures in the support members 33c and 34c and the four end portions of the support block into threaded bores of the base plate.

The support block has central very narrow support surfaces 110 and 111 on opposite sides of its central groove 112, which engage the transversely central portions of the support members 33c and 34c, the connector portions 35c and 36c and the bearing members 27c and 28c, respectively. The surfaces 110 and 111 lie in a common plane which is spaced inwardly of the plane in which lie the top surfaces of the support block portions 93, 94, 101 and 102 so that an upward central stress is applied to the connector members and the bearing members.

As a result arms 71c and 72c move outwardly to a position shown in dashed outline 71c' and 72c' and the movement of free ends of the arms can be detected by means to measure calibrated to a scale.

The load cell 20c may be used where extremely light loads are to be measured using extremely thin operator members, the prestress insuring that predictable contact is maintained between the connector portions 35c and 36c and the surfaces 110 and 111. Further the load cell 20c has the welds 95 and 96 on support member 33c removed as far as practical from the connector portion 35c to avoid welding stresses in the connector portion as a result of welding a thin operator member.

It will now be apparent that a new and improved load cell has been illustrated and described which is of very simple structure and which has an operator member whose beam member deflects with load and the stress in which is measured or detected by suitable means, such as strain gages.

It will further be seen that the operator member is isolated or protected from extraneous forces which would impair the accuracy of the output of the load cell, especially over wide ranges of load imposed thereon.

Figure 12:
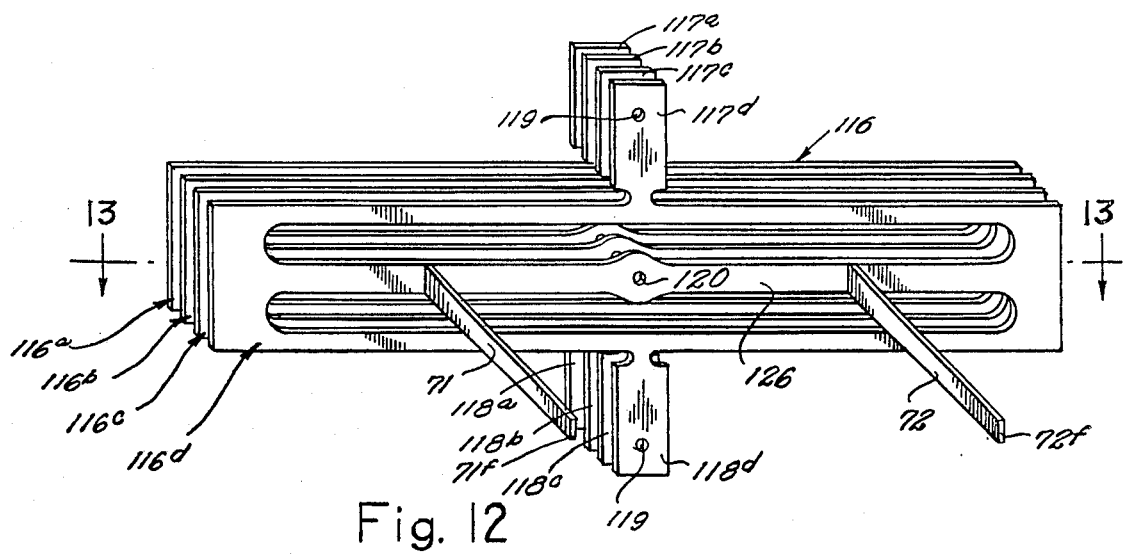
FIG. 12 is an exploded bottom perspective view of a third embodiment of the load cell.
Figure 13:
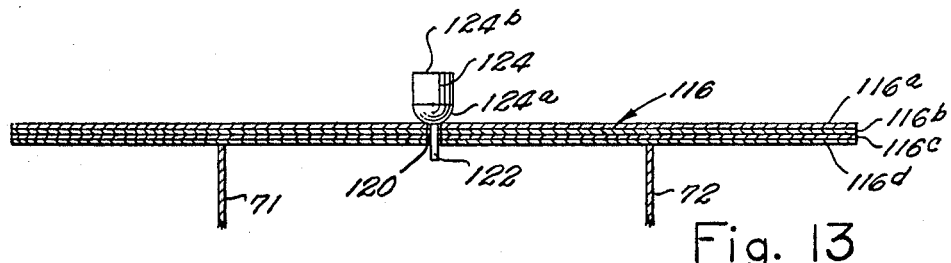
FIG. 13 is a cross-sectional view taken along line 13—13 of FIG. 12.

A third modified form of the load cell operator member 116, illustrated in FIGS. 12 and 13 of the drawing, comprises two or more superposed layers or sheets of metal 116a, 116b, 116c, 116d having laterally outwardly extending support members 117 and 118 with apertures 119 formed therein for securing the operator member 116 to end portions 38 and 39 of the support block 21.

The operator member 116 has outwardly extending indicator arms 71 and 72 which function in the same manner as hereinbefore described.

The central support beam has an aperture 120 formed therein to receive pin 122 which is rigidly secured to a load support post 124 having a hemispherical shaped bottom end 124a and a flat upwardly facing surface 124b for securing same to platform 60. The hemispherical surface 124a allows the support block 24 to touch only at the circumference of aperture 120 thus forming a point loading of the beam central portion 126 to which the arms 71 and 72 are connected.

Figure 14:
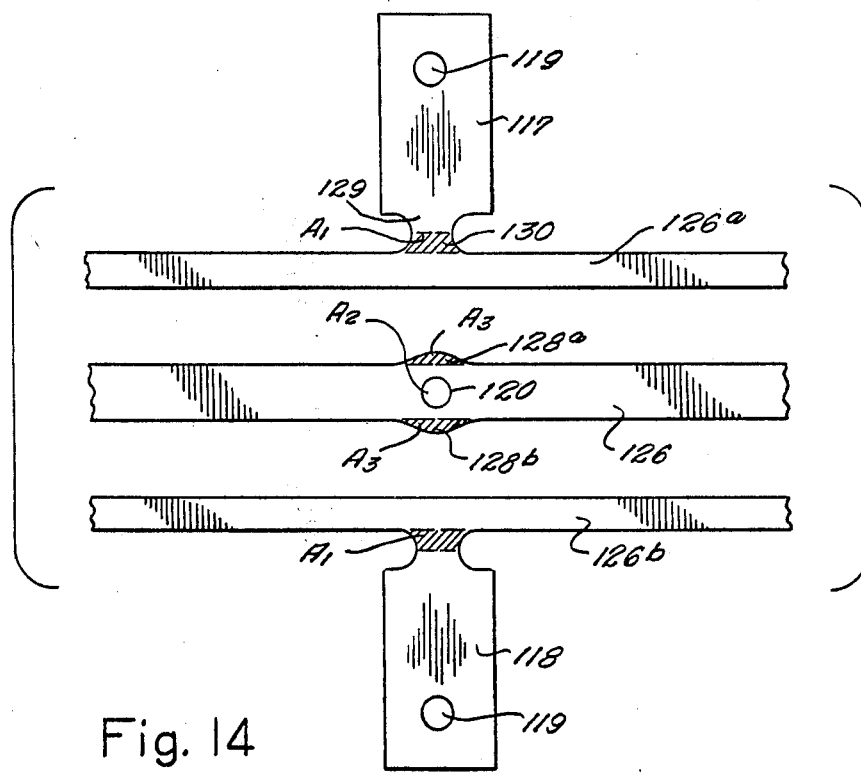
FIG. 14 is an enlarged fragmentary plan view of the load cell illustrated in FIG. 12.

As illustrated in FIG. 14, the diameter of aperture 120 is very small in relation to the length L of the support beam 126 and has an area A2. To compensate for the removal of area A2 of aperture 120 from the beam 126 projections 128a and 128b shown by the cross-hatched area are added, projections 128a and 128b each having an area A3. A cross-hatched area 130 having an area A1, is shown between the outward support member 126a and the support 117 and the area 130 is equal to one-half of the connector 129 between member 126a and 117. The relation between the areas is given in the formula $A2 = A1 + 1/2(A3)$. When aperature 120 is formed in central beam 126 the stiffness of the beam at that point is altered such that area A3 must be added to compensate for the reduction in stiffness to make the bending of beam 126 uniform to give accurate and uniform movement of arms 71 and 72.

Figure 15:
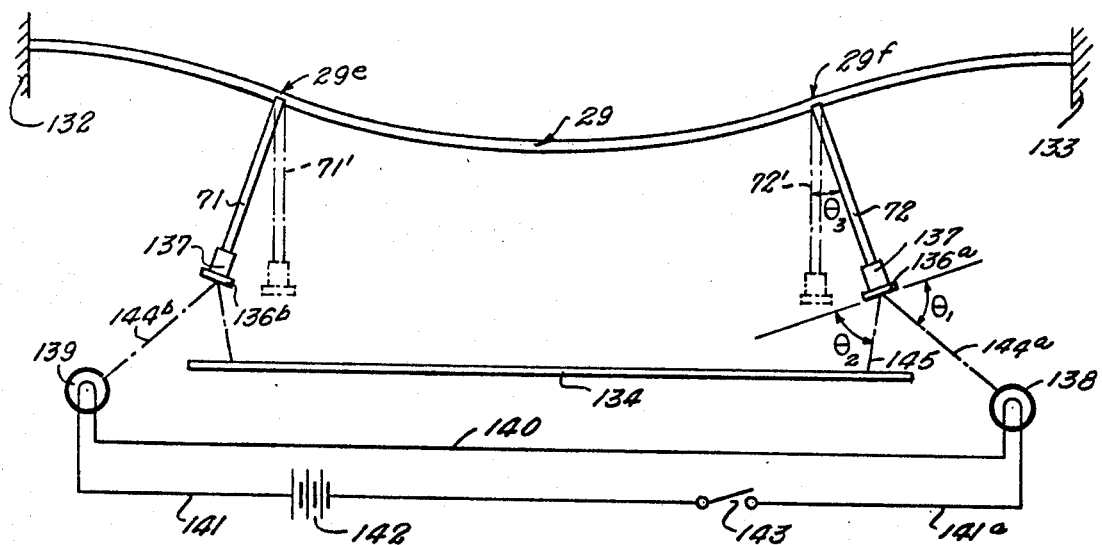
FIG. 15 is a diagrammatic view of a load cell having a first form of optical indicator means associated therewith to indicate the angle of deflection of the neutral axis of a beam.

Referring to FIG. 15 a typical support beam 29 is rigidly secured by ends 132 and 133 and is in a loaded position. The deflection of the beam will be symmetric if the beam 29 is loaded in the middle, however, if the load is not in the middle the distance between the indicator arms 71 and 72 will be uniform and a direct function of the load. Arms 71 and 72 move outwardly from their original positions 71' and 72' as a function of the deflected beam 29. Reflector means such as mirrors 136a and 136b are secured to arms 72 and 71 by means of plastic couplings 137 and arranged to reflect a light beam from a source of light 138 or 139 onto scale 134 secured below arms 71 and 72. Light sources 138 are 139 are connected by conductor 140 and conductor 141 connects light 139 to a current source 142 which is connected to a switch 143 and wire 141a completes the circuit to light 138 such that they produce a beam of light indicated by the dashed outline 144a and 144b. The light strikes mirror 136a at an angle of incidence $\theta 1$ and is reflected at an angle of reflection $\theta 2$ which is equal to $\theta 1$. As the angle of deflection $\theta 3$ between arm 72' and arm 72 increases the angle of incidence and reflection $\theta 1$ and $\theta 2$ will be increased thus changing the position of the light beam as shown by dashed line 145 on the scale 134. The scale 134 is calibrated in the units of weight such that at the point the light beam strikes the scale will give the weight of the load.

Figure 16:
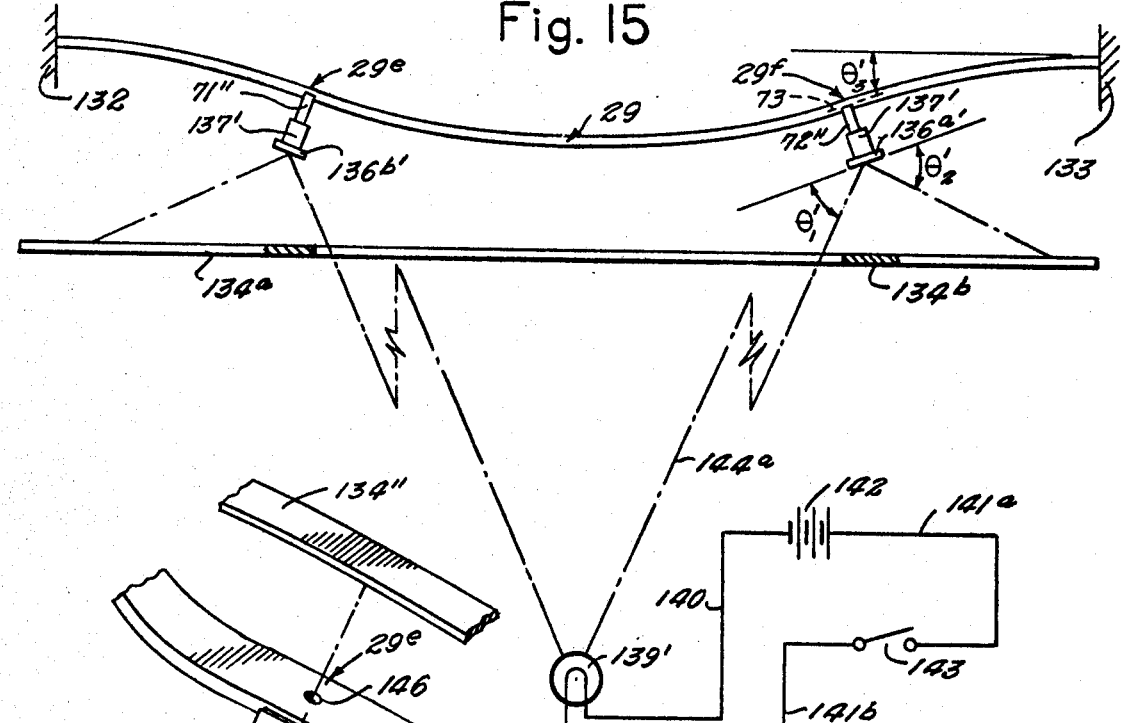
FIG. 16 is a diagrammatic view of a load cell having a second form of optical indicator means associated therewith to indicate the angle of deflection of the neutral axis of a beam.

Referring to FIG. 16 a first modified form of the mirror-light scale means is illustrated having a light source 139' connected by wire 140 to battery source 142 and a wire 141a connected to switch 143 the other side of which is connected to wire 141b which is connected to light source 139'. Reflector means such as mirrors 136a' and 136b' are connected by plastic holders 137' to shorter arms 71'' and 72'' thus making the plane parallel to the surface of the mirrors 136a' and 136b' equal to the angle of deflection $\theta 3'$. As angle $\theta 3'$ increases the angle of incidence $\theta 1'$ increases which is equal to the angle of reflection $\theta 2'$. Light beam 144b may be read on a scale 134b or 134a at each end of the load cell 20 so as to allow reading of the weight at the point the light strikes the scale 134b to determine the weight upon beam 29.

Figure 17:
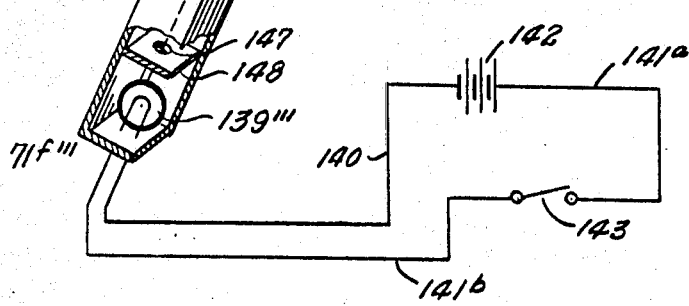
FIG. 17 is a diagrammatic view of a load cell having means associated therewith to form a beam of light which is transmitted perpendicular to the neutral axis of a load carrying beam to indicate the angle of deflection of the neutral axis.

A second modified form shown in FIG. 17 of the drawing has a hollow arm 71''' secured to beam member 29 at 29e and 29f having a light source 139''' secured in the bottom of the indicator arm 71''' and a plate 148 with an aperture 147 formed therein and an aperture 146 formed in beam 29. Light passes through apertures 147 and 146 onto scale 134′′′ which is calibrated in units of weight. As end 71f′′′ moves the light beam will move thus indicating the load on beam 29.

Figure 18:
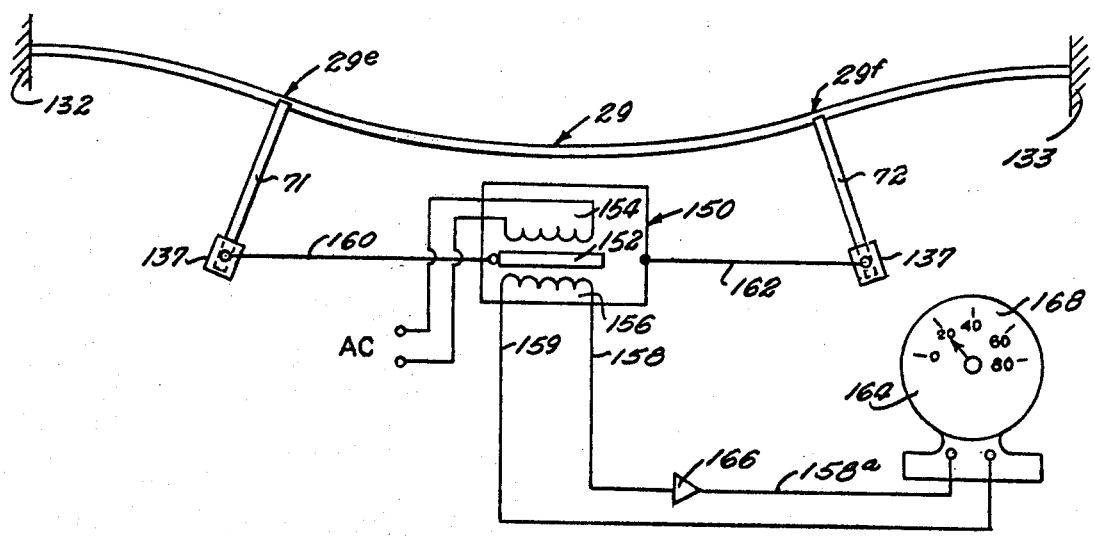
FIG. 18 is a diagrammatic view of a load cell having a linear differential voltage transformer associated therewith to indicate displacement of ends of indicator arms.

As illustrated in FIG. 18, a linear or differential voltage transformer 150 comprising a primary coil 154 and a secondary coil 156, all disposed along a common axis and having in the common magnetic circuit a movable iron core 152 longitudinally displaceable with the motion to be measured such that movement of the core changes the voltage in coil 156. The primary coil 154 is connected to a suitable power source. Core 152 has one end secured to a non-elastic connector 160 which is connected to coupling 137 of arm 71 such that as arm 71 moves so does core 152. The transformer 150 is rigidly secured to a non-elastic connector 162 which is secured to coupling 137 of arm 72 so that as a load is placed on beam 29 movement of arms 71 and 72 outwardly pulls the core 152 to the left as shown in FIG. 18 and the coils 154 and 156 to the right changing the voltage transfer to coil 156 from coil 154. As movement outwardly of the core 152 occurs a voltage increase across leads 158 and 159 is registered by meter 164 by movement of the needle. It is appreciated that movement of arms 71 and 72 is proportional to the voltage across the secondary coil 156. As the movement of the arms 71 and 72 may be very slight, an amplifier 166 is secured to lead 158 for amplification of the voltage from coil 156. The amplifier 166 is connected to lead 158a, the other end of which is secured to meter 164. Meter 164 is secured to lead 159 which is secured to coil 156 to complete the circuit. A voltage increase is monitored by meter 164 having a dial which is calibrated weight units to read the weight of the load placed on beam 29.

Figure 19:
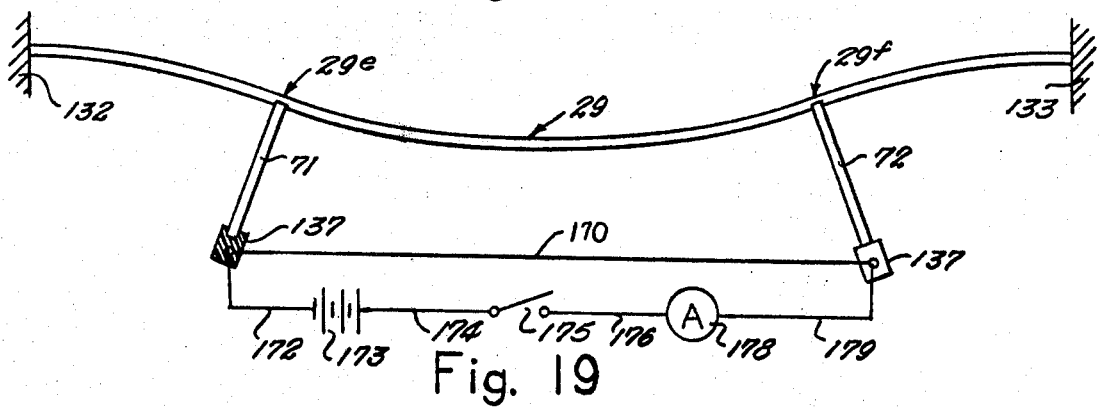
FIG. 19 is a diagrammatic view of a load cell having a resilient conductive non-linear resistive transducer associated therewith to indicate displacement of ends of indicator arms which extend perpendicularly from the neutral axis of the load beam.

FIG. 19 illustrates a alternate method of recording the movement of arms 71 and 72 having resilient electrically conductive resistive element such as a single wire strain gauge 170 secured to arms 71 and 72 by means such as couplings 137. Lead 172 is connected to one end of strain gauge 170 and is secured to the negative pole of battery 173, the positive side of battery 173 is connected to lead 174 which is connected to one side of switch 175, the other side of which is connected by lead 176 to one side of an ammeter 178. The other side of the ammeter is connected by lead 179 to the other side of strain gauge 170. The switch 175 is closed when a load is placed on beam 129. The load stretches the strain gauge 170 as beam 29 deflects by the outwardly movement of arms 71 and 72 resulting in a change of resistance of strain gauge 170 and thus because of the fixed voltage source 173 a change in the amperes flowing in the circuit. The ammeter measures the amperes in the circuit and is calibrated in weight units to indicate the weight of the load on beam 29 which is proportional to the current in the circuit.

Figure 20:
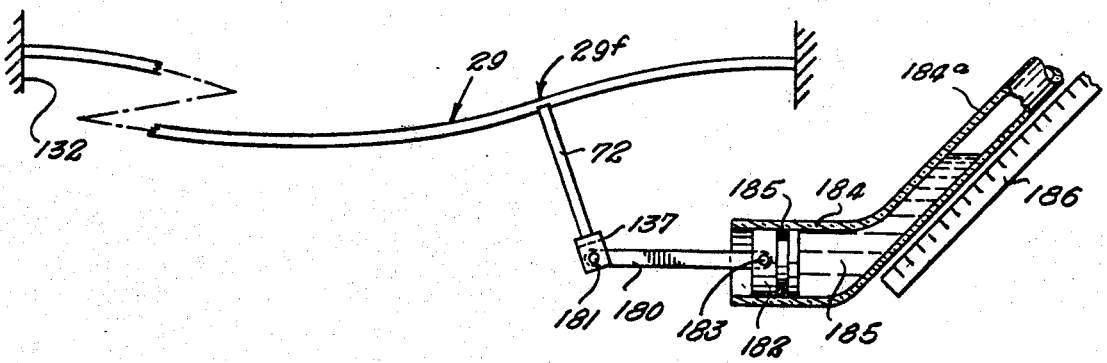
FIG. 20 is a diagrammatic view of a load cell having a liquid filled tube associated therewith to indicate the angle of deflection of the neutral axis of the beam.

FIG. 20 illustrates a mechanical measure means comprising a coupling 137 connected to arm 72 having a piston rod 180 pivotally secured to coupling 137 by pin 181, the other end of rod 180 is connected to a piston 182 by pin 183. The piston 182 is slideably secured in a preferably translucent tube 184 and has an O-ring 185 to seal the side of piston 182. The translucent tube 184 has a liquid 185 and an upwardly sloping neck 184a in which the level of the liquid 185 may be read. As the piston 182 moves in or out by the outwardly movement of arm 72 due to a load placed on beam 29, the water level in the neck 184a of tube 184 will then rise or fall the amount of which being a function of the deflection of beam 29. A scale 186 may be placed beside the tube neck 184a which is calibrated in weight units to read the load on beam 29.

It will also be seen that while the load cell described herein has been shown in all cases to be subjected to a downwardly vertical load, the load cell may be used to measure an upwardly vertical load.

From the foregoing it should be readily apparent that each of the embodiments hereinbefore described accomplishes the objects of the invention hereinbefore discussed.

It should be appreciated that other and further embodiments of the invention may be devised without departing from the basic concept thereof.

Having described my invention, I claim:

1. A load cell comprising: a beam having a neutral axis; a pair of bearing members spaced from and parallel to said beam; end portions connecting outer ends of said beam and said bearing members; a pair of support members spaced outwardly of the bearing members and connected at at longitudinally central portions of the bearing members for supporting the bearing members; load support means secured to said beam centrally between outer ends of said beam; an indicator arm, said indicator arm being spaced equidistantly between one end of said beam and said load support means; and means securing said indicator arm to said beam such that upon deflection of said beam the angular relationship between said indicator arm and the neutral axis of the beam at the point of attachment of the indicator arm to the beam is unchanged.

2. The combination called for in claim 1 with the addition of: means associated with said indicator arm to relate movement of an end of said indicator arm to the magnitude of force applied to the load support means.

3. The combination called for in claim 2 with the addition of a second indicator arm, said second indicator arm being spaced equidistantly between the other end of said beam and said load support means; and means securing said second indicator arm to said beam such that upon deflection of said beam the angular relationship between said second indicator arm and the neutral axis of the beam at the point of attachment of the second indicator arm is unchanged, said indicator arms being arranged such that spacing between ends of the arms is a function of the magnitude of force applied to the load support means to deflect said beam.

4. The combination called for in claim 3 wherein said means associated with said indicator arm comprises: reflector means on each of said arms; a source of light; and a scale positioned such that light from said source is reflected onto said scale.

5. The combination called for in claim 3 wherein said means associated with said indicator arm comprises: a linear differential voltage transformer having a coil and a core; means securing said coil to one of said indicator arms; and means securing said core to the other indicator arm.

6. The combination called for in claim 3 wherein said means associated with said indicator arm comprises: a resilient electrically conductive resistive element; means securing one end of said resistive element to one of said arms; and means securing the other end of said resistive element to the other arm.

7. The combination called for in claim 2 wherein said means associated with said indicator arm comprises: a source of light secured to said indicator arm, said beam having an aperture formed therein through which a beam of light is emitted from said source of light; and a scale positioned such that said beam of light strikes said scale.

8. The combination called for in claim 2 wherein said means associated with said indicator arm comprises: a piston; means securing said piston to said indicator arm; a liquid containing tube, said piston being slidably disposed in said tube such that the elevation of the upper surface of the liquid is a function of the magnitude of force applied to the load support means to deflect the beam.

9. The combination called for in claim 1 with the addition of: a support disposed below the bearing members providing horizontal support surfaces lying in a common horizontal plane, said support members resting on and being rigidly secured to said support surfaces.

10. The combination called for in claim 9 with the addition of: connector members between said bearing members and said support means of lesser width than said bearing members.

11. The combination called for in claim 10 with the addition of: narrow edge surfaces extending inwardly of said support surfaces lying in the said horizontal plane and extending below and engaging said connector members and bearing members.

12. The combination called for in claim 11 wherein the combined widths of said bearing members are equal to the width of said beam member.

13. The combination called for in claim 10 wherein said connector portions partially overlie said support surfaces and extend inwardly of inner ends of said support surfaces.

14. The combination called for in claim 1 wherein said load support means comprises: a post member having a downwardly opening slot in which said beam member is receivable.

15. The combination called for in claim 14 wherein said post member is secured to the sides of said beam by welds.

16. The combination called for in claim 15 wherein the neutral axis of said beam member extends between and is spaced from the top and bottom ends of said welds.

17. The combination called for in claim 1 wherein said load support means comprises: a load support post having a hemispherical shaped end; a pin extending outwardly from said hemispherical shaped end, said beam having an aperture formed therein into which said pin extends.

18. The combination called for in claim 1 wherein said beam comprises a plurality of superposed layers of beam members, said indicator arm being secured to one of said beam members.

19. The combination called for in claim 1, said means securing said indicator arm to said beam comprising: spaced legs on said indicator arm; means securing said spaced legs to said beam adjacent opposite sides of said neutral axis such that said indicator arm is maintained in a fixed angular relationship to said neutral axis adjacent said legs.

20. A load cell comprising: a substantially planar operator member having a pair of parallel longitudinal slots providing a central beam member, a pair of bearing members spaced from and parallel to said beam member and end portions connecting outer ends of said beam and bearing members, said operator member including a pair of support members spaced outwardly of the bearing members and connected at the longitudinally central portions of the bearing members for supporting the operator member, said beam member having a central portion; a load support secured to the central portion of said beam member; an indicator leg secured to and extending perpendicular to said beam member; and a support means disposed below the operator member providing fixed horizontal support surfaces lying in a common horizontal plane, said support members resting on and rigidly secured to said support surfaces.

21. The load cell of claim 20, wherein said operator member has connector portions of lesser width than said support members connecting the bearing members to said support members.

22. The load cell of claim 21, wherein said support means has narrow edge surfaces extending inwardly of said support surfaces lying in the said horizontal plane and extending below and engaging said connector portions and bearing members.

23. A load cell comprising: a beam having a neutral axis; end support means secured to opposite ends of said beam, said end support means preventing deflection of the neutral axis of the beam at each end of said beam; load support means secured to said beam centrally between said end support means; first and second indicator arms; means securing said first and second indicator arms to said beam such that each of said indicator arms is spaced equidistantly between one of said end support means and said load support means; reflector means on each of said arms; a source of light; and a scale positioned such that light from said source is reflected onto said scale to relate movement of ends of said indicator arms to the magnitude of force applied to the load support means.

24. A load cell comprising: a plurality of superposed layers of beam members positioned to form a beam having a neutral axis; end support means secured to opposite ends of said beam members, said end support means preventing deflection of the neutral axis of the beam at each end of said beam members; load support means secured to one of said beam members centrally between said end support means; an indicator arm, said indicator arm being spaced equidistantly between one of said end support means and said load support means; and means securing said indicator arm to one of said beam members such that upon deflection of said beam the angular relationship between said indicator arm and the neutral axis of the beam at the point of attachment of the indicator arm to the beam is unchanged.

* * * * *